Dec. 21, 1965   J. F. CELLA ET AL   3,224,549
METHOD OF AND APPARATUS FOR TRANSFERRING
CASELOADS OF ARTICLES
Filed Nov. 21, 1962                                    4 Sheets-Sheet 2
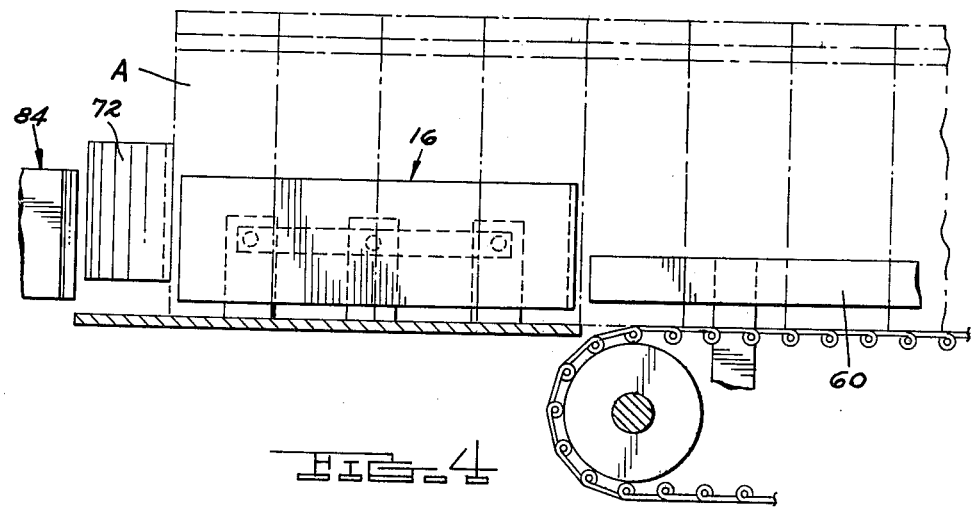
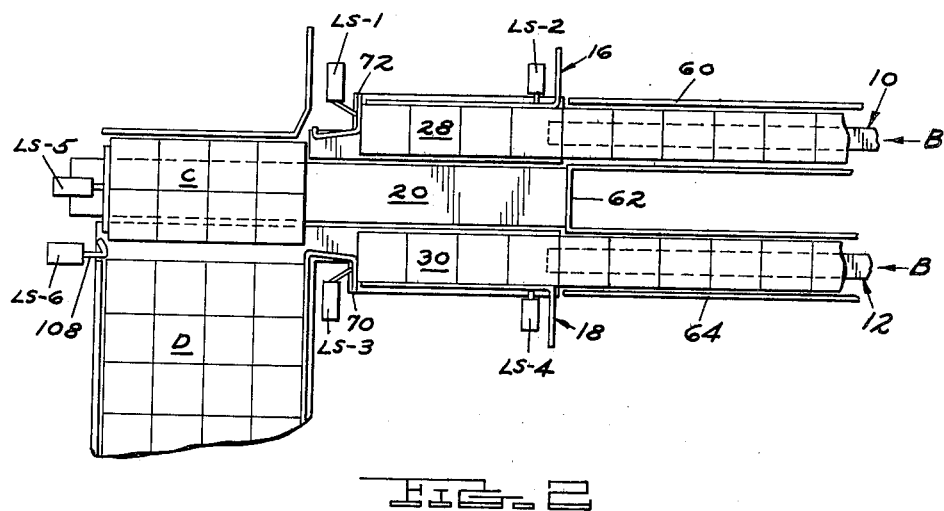
INVENTORS
JOSEPH F. CELLA
JAMES L. LOBIK
BY
Burton & Parker
ATTORNEYS Dec. 21, 1965  J. F. CELLA ET AL  3,224,549
METHOD OF AND APPARATUS FOR TRANSFERRING
CASELOADS OF ARTICLES
Filed Nov. 21, 1962  4 Sheets-Sheet 3
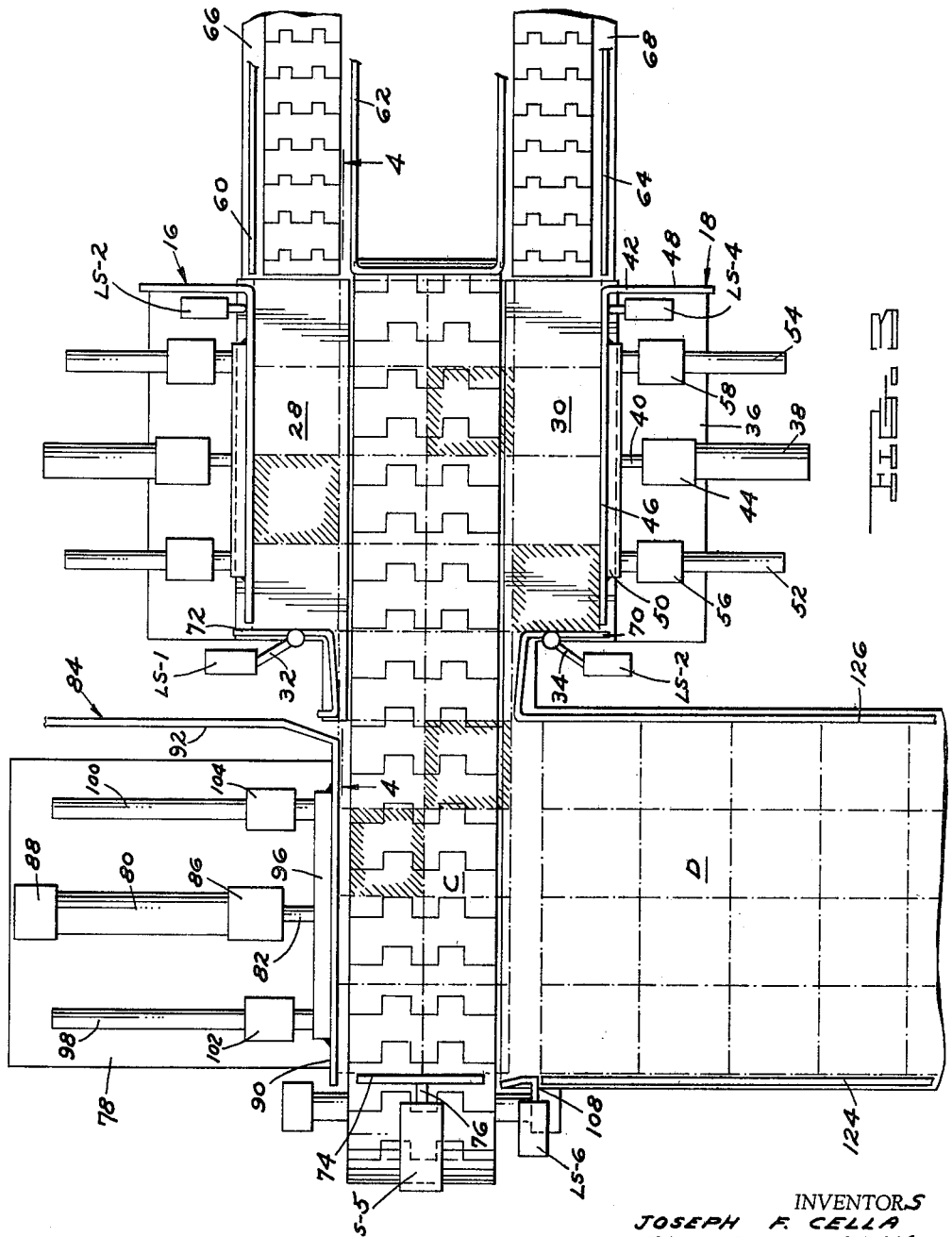
INVENTORS
JOSEPH F. CELLA
JAMES L. LOBIK
BY
Burton & Parker
ATTORNEYS

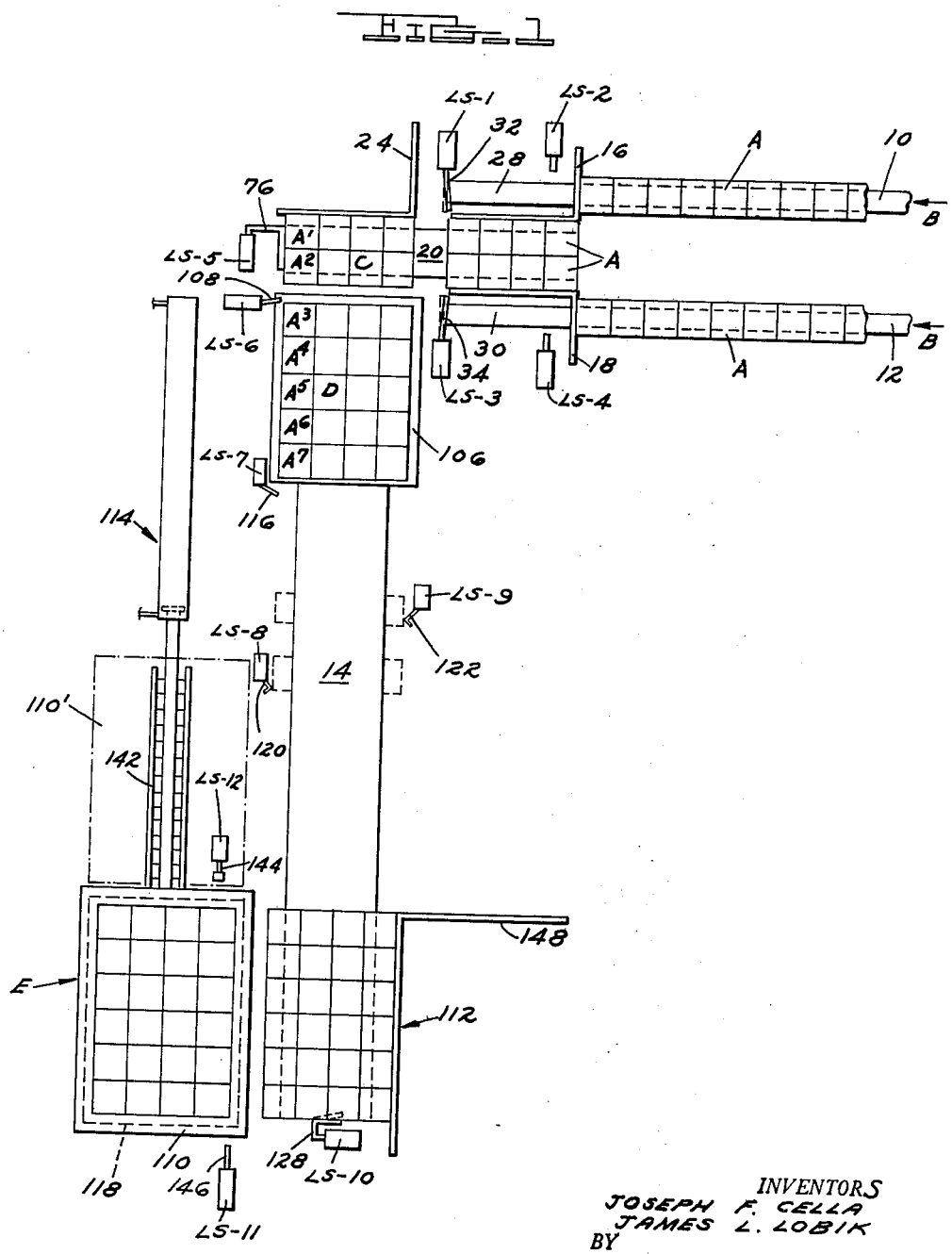

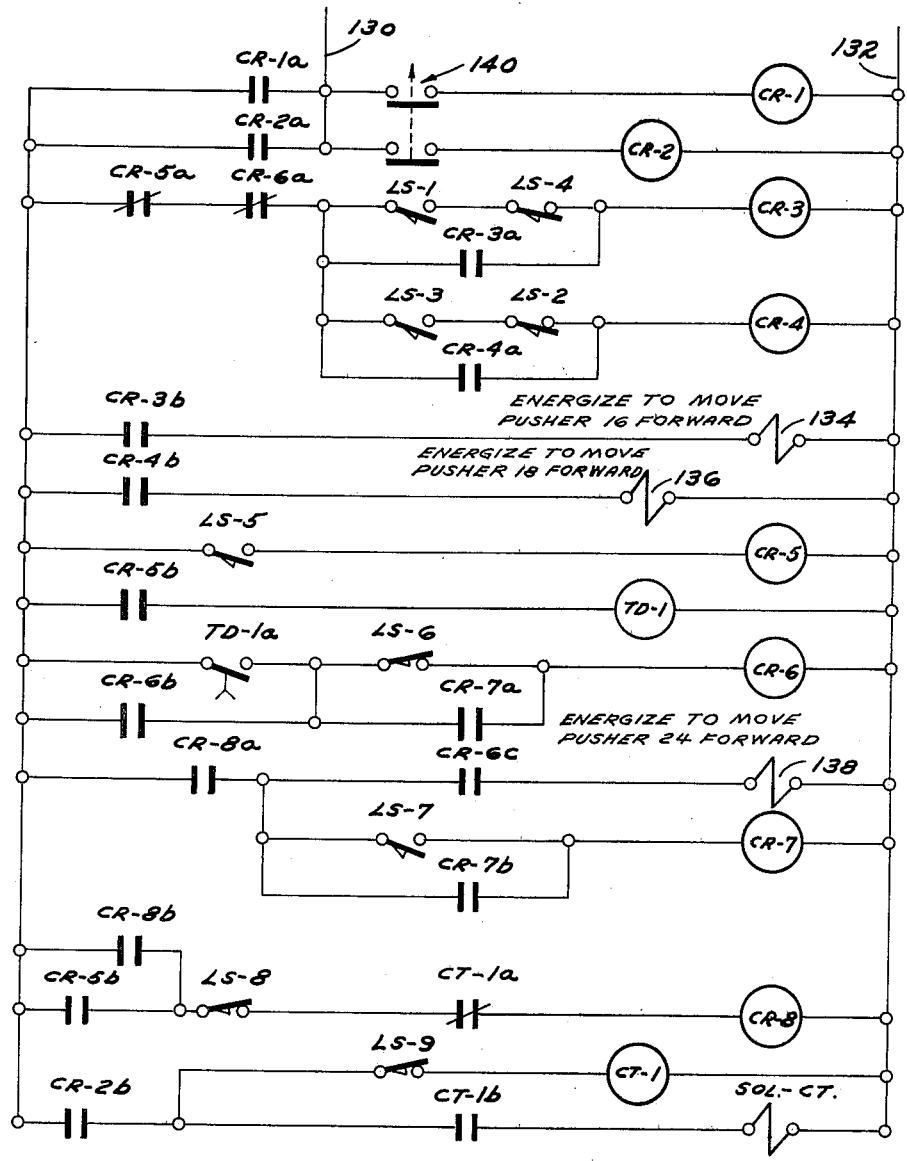

United States Patent Office 3,224,549
Patented Dec. 21, 1965

3,224,549
METHOD OF AND APPARATUS FOR TRANSFERRING CASELOADS OF ARTICLES
Joseph F. Cella, Bronxville, N.Y., and James L. Lobik, Holyoke, Mass., assignors to Cesco Container Mfg. Corp., New York, N.Y., a corporation of Massachusetts
Filed Nov. 21, 1962, Ser. No. 239,132
9 Claims. (Cl. 198—30)

This invention relates to a method of and apparatus for transferring compacted groups of articles to one or more outfeed conveyors from two or more infeed conveyors which may deliver articles at varying rates. More specifically, the invention relates to a method of and apparatus for assembling caseloads of articles on an outfeed conveyor for transfer to a casing machine, which machine deposits the articles in an awaiting case. The invention is of particular utility in the transfer of milk cartons in dairies, wherein two or more infeed conveyors deliver cartons at varying rates from filling and sealing machines, and it is desired to transfer the cartons to a single outfeed conveyor in accumulated caseloads for delivery to a casing machine. In the dairy industry it frequently becomes desirable to deliver the output from two or more filling machines to a single casing machine which deposits an entire caseload of cartons into the case in one operation. However, in conventional apparatus for delivering the cartons to the casing machine, the cartons were fed to the machine in more or less random sequence, necessitating the provision in the casing machine of some sort of marshalling device operable to assemble the cartons into a compacted group of a predetermined size before they could be transferred to an awaiting case. Thus it was necessary for the casing machine to perform two successive operations on the cartons; first to marshall the cartons into a group, and then to deposit the group into an awaiting case.

The primary object of the invention is the provision of a method and apparatus for transferring articles to one or more outfeed conveyors from a plurality of infeed conveyors which may deliver articles at varying rates, and accumulating the articles on the outfeed conveyor into groups of a predetermined size, wherein the speed of transfer and accumulation is automatically responsive to variations in the delivery rates of any one or all of the infeed conveyors.

Another object of the invention is the provision of a method and apparatus as aforesaid wherein the size of successive groups of accumulated articles may be automatically varied according to a predetermined sequence.

Other objects, advantages and meritorious features will more fully appear from the specification, claims, and accompanying drawings, wherein:

FIG. 1 is a top elevation of a schematic representation of mechanism embodying the invention;

FIG. 2 is a partial top elevation similar to FIG. 1;

FIG. 3 is a partial top elevation showing the operating mechanism schematically shown in FIGS. 1 and 2;

FIG. 4 is a cross sectional view taken along line 4—4 of FIG. 3; and

FIG. 5 is a schematic drawing of the electric control circuits of the mechanism of FIGS. 1–4.

The embodiment of the invention shown in the drawings is adapted to transfer articles moving on a plurality of infeed conveyors, such as shown at 10 and 12, to one or more outfeed conveyors, a single outfeed conveyor being indicated generally at 14. Article transfer mechanisms 16 and 18 will automatically transfer articles from infeed conveyors 10 and 12, respectively, to an intermediate conveyor 20 at rates equal to the delivery rate of their associated infeed conveyors. Conveyor 20 communicates with a transfer area C, wherein the articles are transferred by a main transfer mechanism 24 into an accumulating station D. When a predetermined number of articles have accumulated in station D, transfer mechanism 24 is operable to transfer the accumulated group to outfeed conveyor 14.

The two infeed conveyors 10 and 12 may comprise conventional link-belt article supporting spans entrained over suitable pulleys and driven in any convenient fashion, such as by an electric motor or the like (not shown). Articles shown at A move along the conveyors 10 and 12 in the direction of arrows B, and ride off the conveyors onto stationary platforms or dead plates 28 and 30 at the discharge end of the conveyors 10 and 12. As the articles move along conveyors 10 and 12, the leading articles are moved onto and across platforms 28 and 30 by the following articles until the foremost articles in each line abut switch arms 32 and 34 of switches LS–1 and LS–3. These switches are of conventional construction and are schematically shown in FIG. 5 and need not be further described. Platforms 28 and 30 assure that a solid line of articles will be provided in front of transfer mechanisms 16 and 18 when the lead articles strike the switch arms, actuating the mechanism. If the embodiment is installed in a dairy to handle the output of two filling and sealing machines, each infeed conveyor would receive the output from one machine.

Transfer mechanisms 16 and 18 are operable when energized to sweep articles from platforms 28 and 30 onto conveyor 20, which may be of conventional linkbelt construction similar to conveyors 10 and 12. Conveyor 20 must be wide enough to accommodate two lines of articles, as shown. As transfer mechanisms 16 and 18 are of identical construction, only the details of one of them will be described, it being understood that the other comprises the same parts. Referring to FIG. 3, the article transfer mechanism is in the form of a pusher 18, mounted on a base plate 36. The pusher includes a fluid pressure cylinder 38 having a piston rod 40 connected to a generally L-shaped pusher bar 42. Fluid pressure cylinder 38 is supported by a block 44 on plate 36. Pusher bar 42 has a front face portion 46 adapted to engage and sweep articles from the platform 30 the articles disposed thereon when the pusher moves from its retracted position shown in FIGS. 2 and 3 to its extended position as shown in FIG. 1. Extending rearwardly from front face portion 46 at one end thereof is a blocking plate 48 which serves as a stop for articles on the infeed conveyor during pusher movement. Pusher bar 42 may be welded to a reinforcing plate 50, having a pair of guide rods 52 and 54 supported in bearing blocks 56 and 58 to support and guide the bar in its reciprocal movement.

Intermediate conveyor 20 is interposed between infeed conveyors 10 and 12 in article receiving relation with platforms 28 and 30. Conveyors 10 and 12 deliver articles between spaced article guide walls 60, 62 and 64 (FIG. 3) which are supported in any convenient manner on the conveyor frames 66 and 68. Guide wall 62 is generally U-shaped, with its base extending transversely across conveyor 20, as shown in FIG. 3.

At the downstream end of the platforms are guide walls 70 and 72, against which articles on the platforms are brought to rest. Each wall 70 and 72 has a slot therein through which switch arms 32 and 34 project to be shifted by articles on the platforms.

The downstream end of intermediate conveyor 20 comprises a transfer area generally indicated at C. At the side of transfer area C opposite conveyors 10 and 12 is a wall-like abutment 74 which serves as a stop for articles entering area C on conveyor 20. There is provided a switch LS–5 having a switch arm 76 projecting through wall 74 to be actuated by articles abutting the wall. Switch arm 76 is positioned so that it will be shifted to actuate switch LS–5 by articles approaching on conveyor 20 from either infeed conveyor.

Operable to sweep articles in the transfer area C therefrom and into an accumulation station D is the main article transfer mechanism in the form of a pusher generally indicated at 24. Such transfer means is mounted on a base plate 78 as shown in FIG. 3. The pusher includes a fluid pressure cylinder 80 having a piston rod 82 connected to a generally L-shaped pusher bar 84. Fluid pressure cylinder 80 is supported at its opposite ends by blocks 86 and 88 mounted on plate 78. The pusher bar 84 has a front face portion 90 which is adapted to engage and sweep from transfer area C any articles disposed therein when the pusher moves from its retracted position as shown in FIG. 3 to an extended position. Extending rearwardly from the forward face 90 at one side thereof is a blocking plate 92 tapered as at 94 to prevent any articles from entering transfer area C during movement of the pusher. Forward face 90 of bar 84 may be provided with a reinforcing plate 96 welded thereto, from which project a pair of rods 98 and 100 journaled in bearings 102 and 104 to guide the pusher in its movement. As hereinafter more fully set forth, the pusher is selectively operable to shift through a short stroke to sweep articles from the transfer area into the accumulating station, and through a long stroke to sweep articles from the transfer area and the accumulating station onto the outfeed conveyor 14.

Accumulating station D comprises a generally rectangular table 106 onto which articles may be swept from the transfer area C by pusher 24. Adjacent the upstream end of table 106 is positioned a switch LS–6 having a switch arm 108 adapted to be actuated by the extremity of pusher portion 90 as the pusher sweeps articles onto the table. Under certain conditions, as hereinafter described, actuation of switch LS–6 will return the pusher to its retracted position. Switch LS–7 is positioned adjacent table 106 at the downstream end thereof to sense the presence of a full caseload of articles on the table. Switches LS–8 and LS–9 are located adjacent conveyor 14 to be actuated by the lead articles in a group to return the transfer means 24 under predetermined conditions as hereinafter more fully described.

Communicating with the end of table 106 opposite pusher 24 is discharge conveyor, which may be comprised of a plurality of parallel spans entrained over suitable pulleys and driven in conventional fashion. The downstream end of conveyor 14 is disposed adjacent a casing machine generally indicated at E, which machine is operable to deposit groups of articles in an awaiting case. The machine includes a retractable table 110 onto which groups of articles are swept from conveyor 14 by a pusher 112. When a group of articles are in position on table 110, they are gripped by a transfer mechanism (not shown), table 110 is retracted to the position shown in phantom outline at 110′ by cylinder-piston assembly 114, and the group of articles is lowered into an awaiting case.

In general the operation of the device shown in the drawings is as follows. Prior to the mechanism being energized, pushers 16, 18 and 24 are in their retracted positions, as shown in FIG. 2. As articles approach on conveyors 10 and 12, the foremost articles are urged by those following across the dead plates 28 and 30 until the lead articles in each line abut stop fences 70 and 72, actuating switch arms 32 and 34 of switches LS–1 and LS–3. Actuation of LS–1 and LS–3 will cause pushers to move forward to sweep articles from plates 28 and 30 onto intermediate conveyor 20, as shown in FIG. 1. In the event that articles build upon on only one conveyor, only the switch associated with the conveyor on which there are accumulated articles will be actuated to move its pusher and sweep articles to conveyor 20. If one pusher has begun to shift to its extended position before articles accumulate in front of the other pusher, the latter will not operate to push articles until the former again returns to its retracted position. This action is controlled by switches LS–2 and LS–4, and is provided so that two widely staggered lines of articles will not be transferred by conveyor 20 into the transfer area C. Such a condition would either necessitate a delay in actuation of pusher 24, or would result in some articles not being in the correct position to be swept into area D when pusher 24 moved forward.

When pushers 16 and 18 move forward, their rearwardly extending gate portions such as shown at 48 in FIG. 3 block entry of additional articles onto plates 28 and 30 from conveyors 10 and 12. As the articles move along conveyor 20, they abut the stop fence 74 at the downstream end of the conveyor and the leading article or articles move switch arm 76, actuating switch LS–5. Actuation of LS–5 energizes a suitable time delay relay, and when the time delay expires, pusher 24 moves forward to sweep articles from transfer area C into accumulating station D. Under normal conditions, as pusher 24 moves forward, it engages switch arm 108 of normally closed switch LS–6, actuation of which causes the pusher to retract. Pushers 16 and 18 continue to operate as above described as long as articles are fed along conveyors 10 or 12. If articles are approaching only on conveyor 10, only pusher 16 will operate, and vice versa with regard to conveyor 12 and pusher 18. Each time articles from either conveyor 10 or conveyor 12 or both enter the transfer area C and abut fence 74, pusher 24 will sweep such articles into accumulating station D.

When articles accumulate to fill station D, the leading row of articles contacts the switch arm 116 of LS–7, which signals pusher 24 that the group of articles is to be transferred to the discharge conveyor 14. Actuation of LS–7 locks out switch LS–6, and on the next forward movement of pusher 24, LS–6 is inoperative to signal return of the pusher, and the pusher travels through its long stroke to sweep an entire group of articles in station D onto the discharge conveyor 14. The size of the group of articles swept onto conveyor 14 is determined by the position of switch LS–8 or LS–9, whichever one of the two is operatively coupled in the circuit during that particular cycle of operation. Only one of the switches LS–8 or LS–9 is operative at any given time, as will become obvious in the following description of the control circuit. Assuming LS–8 to be operative, when the leading article in the group contacts the switch arm of switch LS–8, the pusher 24 is signalled to return to its retracted position, and thus the distance from the downstream end of plate 106 to the arm of switch LS–8 determines the size of the group of articles transferred to conveyor 14.

The system for controlling the automatic operation of the mechanism is schematically shown in FIG. 5. Not shown in FIG. 5 is an electric motor connected in series with suitable relay contacts to be energized by the actuation of switching means, such as a start button or the like. Starting of such motor also completes a circuit to wires 130 and 132. The electric motor drives a fluid pressure pump, which is communicatively coupled in any convenient arrangement with the fluid pressure cylinders hereinabove mentioned with the communication being controlled by solenoid-operated valves. For example, the cylinder 38 (FIG. 3) of pusher 18, is controlled by a valve whose solenoid 136 upon energization pressurizes cylinder 38 to extend the pusher. When the solenoid 136 is de-energized, a spring return in the solenoid controlled valve causes reverse pressurization of the cylinder, retracting the pusher. Solenoid 132 is connected to a valve for controlling the operation of the cylinder of pusher 16, and functions in the same manner as solenoid 136.

Main pusher 24 is controlled by a similar fluid pressure valve. Cylinder 80 is controlled by a valve whose solenoid 138 upon energization causes pressurization of the cylinder to exend the pusher to sweep articles from transfer area C. Upon de-energization of solenoid 138, a spring return in the solenoid control valve causes reverse pressurization of the cylinder and retraction of the pusher.

Upon energization of the control circuits of FIG. 5 as by closure of a suitable start button (not shown), either relay CR–1 or CR–2 will be energized, depending upon the setting of selector switch 140. Energization of relay CR–1 closes normally open contacts CR–1a to furnish current to the control circuits. Energization of relay CR–2 closes normally open contacts CR–2a, and in addition closes relay contacts CR–2b, energizing a control circuit for purposes to be more fully explained hereinafter. Suffice for the present to say that when more than one layer or tier of cartons are to be deposited in a single case, it is necessary in some instances to have a lesser number of articles in one layer than in another. This is commonly referred to in the dairy industry as "odd tiering," and the control circuit energized by relay contacts CR–2b provides for such odd tiering.

Assuming that selector switch 140 is positioned to energize relay CR–1, the status of the circuitry of FIG. 5 is as follows, before any articles have entered the device: the electric motor (not shown) is running, pushers 16, 18 and 24 are retracted, solenoids 134, 136 and 138 are de-energized; CR–1 is energized, while CR–2 through CR–8 inclusive and TD–1 are de-energized; LS–1, LS–3, LS–5 and LS–7 are open, while LS–2, LS–4, LS–6, LS–8 and LS–9 are closed; and the relay contacts are all as shown in FIG. 5 except CR–1a which have been closed by energization of CR–1.

With cartons now entering the device on infeed conveyors 10 and 12, and assuming they enter on both conveyors at the same time, a line of articles will come to rest on dead plates 28 and 30 with the lead articles closing switches LS–1 and LS–3. This energizes relays CR–3 and CR–4, closing LS–3a and LS–4a to lock the relays closed, and LS–3b and LS–4b to energize solenoids 134 and 136. Pushers 16 and 18 thus move forward, sweeping articles onto conveyor 20, while the rearwardly extending portions of the pushers block entry of additional articles onto plates 28 and 30. The pushers remain in their extended position until CR–5 is energized, opening contacts CR–5a to de-energize CR–3 and CR–4. With pusher 16 in its retracted position, LS–2 is held closed. As the pusher moves forward a predetermined amount, LS–2 is opened, preventing the energization of CR–4 to cause energization of solenoid 136 and movement of pusher 18. Thus if pusher 16 begins its forward movement appreciably before a line of articles accumulates in front of pusher 18, actuating LS–3, LS–2 will open the control circuit of relay CR–4, preventing the relay from being energized to move the plunger. Switch LS–4 is associated in a similar manner with pusher 18 to control the operation of pusher 16. This set up serves to insure that if both pushers operate to transfer articles to conveyor 20, they will transfer the articles substantially simultaneously, so that the two articles on conveyor 20 will reach fence 74 at approximately the same time. As the articles enter transfer area C along conveyor 20, they are fed into the area until the lead articles come to rest against fence 74, and close switch LS–5, energizing relay CR–5. Energization of CR–5 opens contacts CR–5a to return pushers 16 and 18, and closes contacts CR–5b, energizing time delay relay TD–1. When TD–1 times out, contacts TD–1a close, energizing relay CR–6. It should be noted that neither CR–3 nor CR–4 can be energized to actuate pushers 16 and 18 until both CR–5 and CR–6 have been de-energized. Time delay TD–1 is provided to insure that all articles on conveyor 20 are in position in area C before pusher 24 moves. When both CR–5 and CR–6 have been energized, contacts CR–5b have closed, energizing CR–8, and contacts CR–6c and CR–8a are closed, energizing solenoid 138 to move the pusher 24 forward.

As stated hereinabove, pusher 24 is shiftable through a short stroke to sweep articles into the accumulating station from the transfer area, and is also shiftable through a long stroke to sweep a group of articles onto the outfeed conveyor 14. Initially, of course, no articles are in accumulating station D, and as pusher 24 is extended by actuation of solenoid 138 to sweep articles from the transfer area C, the extremity of pusher bar 90 (see FIG. 3) shifts the switch arm 108 of switch LS–6 to open the switch. Opening of LS–6 de-energizes CR–6, which opens contacts CR–6c and de-energizes solenoid 138, causing reverse pressurization of the pusher fluid pressure cylinder. Thus when pusher 24 reaches the switch arm of LS–6, the pusher is reversed and retracted.

Pusher 24 will reciprocate through its short stroke as set forth above until the accumulating station D is full of articles awaiting transfer to out-feed conveyor 14. The presence of a caseload of articles to be transferred to conveyor 14 is sensed by LS–7 in the following manner. The table 106 of accumulating station D is sized to accommodate one less row of articles than can be accommodated by the case to which the articles are to be transferred. As shown in FIG. 1, there are six rows of quart milk cartons in front of pusher 112 awaiting transfer to a case 118, there being four cartons in each row. Hence, six rows of cartons must be transferred in a group by pusher 24 to outfeed conveyor 14. To accomplish this, the accumulating station D is sized to accommodate five rows of cartons, $A^3$, $A^4$, $A^5$, $A^6$ and $A^7$ (FIG. 1). When these five rows of cartons have accumulated in station D, and additional rows of cartons feed into transfer area C as shown at $A^1$ and $A^2$, FIG. 1, pusher 24 will push an entire caseload onto live outfeed conveyor 14 as follows (see FIGS. 1 and 5): Rows of cartons $A^1$ and $A^2$ contact switch arm 76, closing LS–5 and actuating solenoid 138 after suitable time delay to move pusher 24 forward. As the pusher moves, cartons $A^2$ abut cartons $A^3$, pushing the entire group of cartons forward. As the cartons are pushed, row $A^7$ moves off dead plate 106 onto conveyor 14, and the end carton in row $A^7$ contacts switch arm 116, closing LS–7, and energizing relay CR–7. Energization of CR–7 closes contacts CR–7a, rendering switch LS–6 inoperative. Hence when pusher 24 contacts switch arm 108, opening LS–6, CR–6 remains energized, and the pusher continues its forward travel.

Generally in the dairy industry, the cases are of such a height to accommodate a quart or half-gallon carton. When shorter cartons such as pints, half-pints or the like are to be placed in the cases, more than one layer of cartons are placed in each case, one on top of the other. The operation of the device to accomplish this will be described hereinafter. Assuming, then, that quart cartons are being transferred, CR–1 will be energized and CR–2 de-energized. Hence contacts CR–2b will be open, rendering LS–9 inoperative. With closure of LS–7 rendering LS–6 ineffective, pusher 24 will travel forward through its long stroke to transfer a caseload of cartons onto outfeed conveyor 14.

Switch LS–8 determines the length of stroke of pusher 24. Referring to FIGS. 1 and 5, CR–8 has been energized by the closure of LS–5, energizing CR–5, as above described. LS–8 is provided with a switch arm 120, which is spaced along conveyor 14 a predetermined distance from the edge of dead plate 106, in the instant example, a distance equal to the width of six cartons. Thus as the foremost carton in the group contacts switch arm 120, as shown in dotted outline in FIG. 1, the sixth row of cartons will be just clear of dead plate 106 on conveyor 14. Movement of switch arm 120 opens normally closed LS–8, de-energizing relay CR–8, which in turn opens the circuit to solenoid 138, causing pusher 24 to retract. The caseload of articles on live conveyor 14 will move there-along until coming to rest in front of pusher 112 for transfer to casing machine E. Preferably there are provided guide rails 124 and 126 such as shown partially in FIG. 3, along each side of dead plate 106 and conveyor 14 to guide the cartons in their travel.

In FIG. 1 there is schematically shown a casing machine E for successively depositing the groups of cartons in suitable cases, such as case 118. At the downstream end of conveyor 14 there is positioned a switch LS–10 having a switch arm 128. Pusher 112 is of the same general construction as pusher 24, and is shifted by a fluid pressure cylinder and piston as hereinabove described with reference to pusher 24. Empty cases approach along a case conveyor shown partially at 142 in FIG. 1, and one case is positioned as at 118 directly under table 110 to receive a group of cartons. Switch LS–12 is provided to prevent actuation of pusher 112 unless table 110 is in its position to receive a group of cartons. If the table is in its retracted position as shown at 110′, the underside of the table will shift switch arm 144 of switch LS–12, opening the circuit controlling the pusher 112, and preventing the pusher from sweeping cartons into the machine E.

As the foremost cartons in a group approach along conveyor 14 and contact switch arm 128 of LS–10, assuming table 110 is in its forward position, a circuit will be completed energizing a solenoid to pressurize fluid pressure cylinder to shift pusher 112 in its forward stroke and sweep articles from conveyor 14 onto table 110. Switch LS–11 has a switch arm 146 which is shifted as pusher 112 reaches its fully extended position. Closing of switch LS–11 reverse pressurizes fluid pressure cylinder, causing pusher 112 to retract. The pusher is provided with a rearwardly extending gate portion 148 which serves to prevent entry of any succeeding group of cartons from entering the end of conveyor 14 swept by pusher 112 while it is in extended position. The circuitry for controlling the operation of pusher 112 is of simple construction, and will be obvious to one skilled in the art.

The above discussion assumed that accumulating station D was full of articles, and that two rows of cartons (A¹ and A²) entered transfer area C. As will be obvious from a consideration of FIG. 1, other situations are possible. For example, if five rows of cartons are in station D, and only one row of cartons, say A¹ in FIG. 1, feeds into area C, such one row will be pushed upon actuation of pusher 24 to abut the rearmost row in station D, forming a group of six rows. As the foremost row of cartons will contact switch arm 116 closing LS–7 before the extremity of pusher 24 strikes arm 108 of LS–6, the latter will be rendered inoperative, and pusher 24 will move through its long stroke. If, on the other hand, only four rows have accumulated in station D, and two rows are fed into area C for transfer, the operation will be the same, and all six rows will be transferred simultaneously to conveyor 14. Thus it can be seen that a group of six rows of cartons will be swept onto the live outfeed conveyor 14 under all conditions.

Assume now that it is desired to place more than one layer of articles in each case, and that the number of articles in one layer is to be different from the other layers. This is commonly referred to in the dairy industry as "odd tiering." For example, when half-pint cartons are being transferred, two normal tiers of six rows of cartons are placed in the case, then a third tier of say four rows of cartons is placed on top of the second tier to make up the caseload. To accomplish this odd tiering, some means must be provided to sense the number of groups of cartons transferred, which means must also be operable to limit the stroke of pusher 24 so that a lesser number of rows will be transferred to the outfeed conveyor 14.

As shown in FIG. 5, there is thus provided a counter relay indicated at CT–1 having a normally closed set of contacts CT–1a. Switch LS–9 is positioned along conveyor 14 a predetermined distance from the end of dead plate 106. In the instant example switch arm 122 of LS–9 will be shifted when the fourth row of cartons rides off the dead plate onto conveyor 14 as shown in FIG. 1. For odd tiering, CR–2 will be energized instead of CR–1, and contacts CR–2b will be closed, rendering LS–9 and CT–1 operative. Groups of cartons are accumulated in station D as described in detail hereinabove. As the first group of cartons is transferred to conveyor 14, the lead carton contacts switch arm 122, opening normally closed LS–9, de-energizing CT–1, which registers one count. This de-energization of CT–1 does not open contacts CT–1a, and so CR–8 remains energized until LS–8 is opened, and a full group of six rows of cartons is transferred to the outfeed conveyor 14. When the group passes switch arm 122, LS–9 closes, energizing CT–1 for the next count. The transfer of the second group to conveyor 14 occurs exactly as above described for the first group, and six rows are transferred, LS–9 opening the circuit to CT–1, causing the latter to register the second count. As pusher 24 again moves through its long stroke, the lead carton strikes switch arm 122, opening LS–9, which causes CT–1 to register the third and final count. When CT–1 counts the third count, contacts CT–1a open immediately, de-energizing relay CR–8, and retracting pusher 24 with only four rows of cartons having been transferred to the outfeed conveyor. In addition, when CT–1 counts for the last time, (in this example the third count) contacts CT–1b close, energizing solenoid CT, which is operative to return counter CT–1 to zero, ready to begin another cycle of operation. Counter CT–1 is of conventional construction, purchasable from a number of manufacturers, and need not be described in further detail.

As will be obvious to one skilled in the art, switches LS–8 and LS–9 may be placed in any desired locations along conveyor 14 to provide groups of any given size. In addition, a counter such as CT–1 may be provided which will operate every second count, or every fourth count, rather than every third as above described. Thus the instant invention may be utilized to provide for transferring many different size groups in any desired sequence.

What is claimed is:

1. That method of transferring caseloads of articles to an outfeed conveyor from a plurality of infeed conveyors delivering articles at various rates comprising: transferring articles from the highest delivery rate infeed conveyor to an article supporting station at a transfer rate substantially equal to the delivery rate of such infeed conveyor, withholding article transfer from a slower delivery rate infeed conveyor to accumulate a line of articles awaiting transfer, periodically transferring articles from the accumulated line on said slower infeed conveyor to the article supporting station simultaneously with the transfer of articles from said highest delivery rate infeed conveyor when said line exceeds a determined size, and transferring a caseload of articles as a unit from said article supporting station to said outfeed conveyor when the group within the article supporting station exceeds a predetermined size.

2. That method of transferring caseloads of articles to an outfeed conveyor supplying a casing machine from a plurality of infeed conveyors, comprising: accumulating a line of articles on each infeed conveyor, transferring articles from each accumualted line to an intermediate conveyor, transferring articles from said intermediate conveyor to an article supporting station, accumulating lines of articles into a compact group of articles in said article supporting station, and periodically transferring a group of articles as a unit from said article supporting station to said outfeed conveyor.

3. Apparatus for the purpose described comprising, in combination: an article transfer area; an article accumulating station in article receiving relation with said transfer area; an outfeed conveyor in article receiving relation with said station; a plurality of infeed conveyors adapted to deliver articles to said transfer area; transfer means alternatively operable to sweep articles from the transfer area into said accumulating station, or to sweep articles from the transfer area and the accumulating station onto said outfeed conveyor; and control means coupled to said transfer means and responsive to the presence of articles in said transfer area to actuate the transfer means to sweep such articles into the accumulating station, and responsive to the simultaneous presence of articles in the transfer area and a predetermined accumulation of articles in said station to actuate the transfer means to sweep such articles onto said outfeed conveyor.

4. Apparatus for the purpose described comprising, in combination: an article transfer area; an article accumulating table disposed in article receiving relation with said transfer area; an outfeed conveyor disposed in article receiving relation with said table; a plurality of infeed conveyors capable of delivering articles to said transfer area; a pusher selectively shiftable through said area to sweep articles therefrom onto said table or through said area and across said table to sweep articles therefrom onto said outfeed conveyor; and a control system coupled to said pusher and having a first part responsive to the presence of articles in said transfer area and a second part responsive to a predetermined accumulation of articles on said table, said control system operable when said first part senses the presence of articles to actuate said pusher to sweep articles from the transfer area onto said table and operable when said second part senses said predetermined accumulation on said table to actuate said pusher to sweep the accumulated articles onto said outfeed conveyor as a unit.

5. Apparatus for the purpose described comprising, in combination: a pair of spaced apart article infeed conveyors; a stationary table at the discharge end of each infeed conveyor; an intermediate conveyor disposed between said tables capable of simultaneously receiving articles from both of the infeed conveyors; transfer means associated with each stationary table shiftable across said tables to sweep articles therefrom onto said intermediate conveyor; an article transfer area disposed in article receiving relation with said intermediate conveyor; an outfeed conveyor; an article accumulating station disposed intermediate said transfer area and said outfeed conveyor; a reciprocable pusher selectively shiftable through the transfer area to sweep articles therefrom into said accumulating station or through said transfer area and said accumulating station to sweep articles onto said outfeed conveyor; a control system coupled with each of said transfer means and said pusher and responsive to a predetermined accumulation of articles on said stationary tables to cause the transfer means associated with the table having such accumulation to transfer articles to the intermediate conveyor; said control system having a first part responsive to the presence of articles in said transfer area and a second part responsive to the accumulation of a group of articles of a predetermined size in said accumulating station, with the control system operable when said first part senses the presence of articles in the transfer area to actuate said pusher to sweep articles therefrom into said accumulating station and operable when said parts sense the simultaneous presence of articles in the transfer area and the accumulation of said group in the accumulating station to actuate the pusher to sweep a group of articles from the area and the station as a unit onto said outfeed conveyor.

6. In apparatus of the character described: an article transfer area; a plurality of infeed conveyors susceptable to delivering articles at varying rates; an article accumulating station at the discharge end of each infeed conveyor; conveying means in article receiving relation with said accumulating stations of the infeed conveyors and in article discharge relation with said transfer area; article transfer means associated with each accumulating station and movable through its respective station to sweep articles therefrom onto said conveying means; and control means coupled to said transfer means and responsive to a predetermined accumulation of articles in any one of said stations to actuate only the transfer means associated with such stations as contain said predetermined accumulation to transfer the accumulated articles to said conveying means.

7. In apparatus of the character described: an article transfer area; a pair of article infeed conveyors susceptible to delivering articles at varying rates; an article accumulating table at the discharge end of each infeed conveyor; an intermediate conveyor having an inlet and disposed between said tables and a discharge end disposed in article discharge relation with said transfer area; a pusher at the discharge end of each infeed conveyor shiftable across said table to sweep articles therefrom onto said intermediate conveyor; and control means coupled with said pushers and responsive to a predetermined accumulation of articles on said tables to actuate the pushers and sweep articles onto said intermediate conveyor.

8. The invention as defined in claim 7 characterized in that said control means includes a part associated with each of said pushers responsive to the movement of a respective pusher, and operable when said part senses the movement of such pusher through a predetermined distance to prevent actuation of the remaining pusher.

9. That method of transferring caseloads of articles to an outfeed conveyor supplying a casing machine from a plurality of infeed conveyors susceptible of delivering articles at varying rates, comprising: accumulating articles on each infeed conveyor, successively transferring articles from the highest delivery rate infeed conveyor to an intermediate conveyor whenever the accumulated group on such infeed conveyor reaches a predetermined size, transferring articles from a slower delivery rate infeed conveyor to said intermediate conveyor substantially simultaneously with the transfer of articles from the highest delivery rate infeed conveyor whenever the accumulation on said slower conveyor reaches said predetermined size, transferring articles from said intermediate conveyor to an article supporting station whenever articles from any of said infeed conveyors reach a preselected position on said intermediate conveyor, accumulating a compacted group of articles in said article supporting station, and periodically transferring a group of articles as a unit from said article supporting station to said outfeed conveyor.

References Cited by the Examiner
UNITED STATES PATENTS

| | | | |
|---|---|---|---|
| 2,596,339 | 5/1952 | Lufkin | 53—162 |
| 2,603,340 | 7/1952 | Warren | 198—32 |
| 2,630,951 | 3/1953 | Slightam | 53—26 |

SAMUEL F. COLEMAN, *Primary Examiner.*

EDWARD A. SROKA, *Examiner.*